(12) United States Patent
Sekiguchi et al.

(10) Patent No.: US 11,661,931 B2
(45) Date of Patent: May 30, 2023

(54) CRYOPUMP AND BAFFLE PLATE FOR CRYOPUMP

(71) Applicant: Ulvac Cryogenics Incorporated, Chigasaki (JP)

(72) Inventors: Shunichi Sekiguchi, Chigasaki (JP); Junichi Yasuda, Chigasaki (JP); Wenguan Piao, Chigasaki (JP); Yoshinobu Murayama, Chigasaki (JP)

(73) Assignee: Ulvac Cryogenics Incorporated, Chigasaki (JP)

( * ) Notice: Subject to any disclaimer, the term of this patent is extended or adjusted under 35 U.S.C. 154(b) by 0 days.

(21) Appl. No.: 17/487,448

(22) Filed: Sep. 28, 2021

(65) Prior Publication Data

US 2022/0163025 A1 May 26, 2022

(30) Foreign Application Priority Data

Nov. 24, 2020 (JP) .............................. JP2020-194450

(51) Int. Cl.
*F04B 37/08* (2006.01)
*B01D 8/00* (2006.01)

(52) U.S. Cl.
CPC ................ *F04B 37/08* (2013.01); *B01D 8/00* (2013.01)

(58) Field of Classification Search
CPC ........ F04B 37/08; F04B 39/00; F04B 39/121; B01D 8/00
See application file for complete search history.

(56) References Cited

U.S. PATENT DOCUMENTS 9,266,038 B2 * 2/2016 Syssoev .................... B01D 8/00
10,456,706 B2 * 10/2019 Oikawa ..................... F04B 37/08
10,495,079 B2 * 12/2019 Wells ....................... F04B 53/16

FOREIGN PATENT DOCUMENTS

JP         2010-048132 A        3/2010

* cited by examiner

*Primary Examiner* — Lionel Nouketcha
(74) *Attorney, Agent, or Firm* — Wolf, Greenfield & Sacks, P.C.

(57) ABSTRACT

A cryopump includes a cryopanel, a main body, and a baffle plate. The cryopanel is connected to a refrigerator. The main body accommodates the cryopanel. The baffle plate is located in a gas inlet of the main body. The baffle plate includes a first portion and a second portion. The first portion includes a center of the baffle plate and a first hole extending through the baffle plate. The second portion includes an edge of the baffle plate and a second hole extending through the baffle plate. The second portion has a greater conductance than the first portion.

6 Claims, 2 Drawing Sheets

CRYOPUMP AND BAFFLE PLATE FOR CRYOPUMP

RELATED APPLICATION

This Application claims priority to Japanese application number 2020-194450, filed Nov. 24, 2020, which is incorporated herein by reference in its entirety.

BACKGROUND

1. Field

The present disclosure relates to a cryopump and a baffle plate for a cryopump.

2. Description of Related Art

Japanese Laid-Open Patent Publication No. 2010-48132 discloses an example of a cryopump. The cryopump described in the publication includes a pump case, a heat shield located inside the pump case, cryopanels located inside the heat shield, and a baffle located in an opening of the heat shield. The heat shield includes a first shield and a second shield. The first shield and the second shield are each cylindrical. The shields are arranged coaxially in the pump case. The second shield is located at an outer side of the first shield. The first shield is located closer to an opening of the pump case than the second shield. The proximal end of the first shield is surrounded by the distal end of the second shield. This forms a fluid passage between the proximal end of the first shield and the distal end of the second shield.

In the cryopump, in addition to the gas flowing through the baffle into the heat shield, the cryopanels evacuate the gas flowing through the flow passage, which is formed between the proximal end of the first shield and the distal end of the second shield, into the second shield. This improves the evacuation capability of the cryopump. However, the heat input to the flow passage, which is formed by the proximal end of the first shield and the distal end of the second shield, is increased compared to when the heat shield is formed by a single cylindrical member. This lowers the evacuation capability of the cryopump. Accordingly, there is a need for a different structure that improves the evacuation capability of the cryopump.

SUMMARY

One objective of the present disclosure is to provide a cryopump and a baffle for a cryopump that improve the evacuation capability.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a cryopump includes a cryopanel, a main body, and a baffle plate. The cryopanel is connected to a refrigerator. The main body accommodates the cryopanel. The baffle plate is located in a gas inlet of the main body. The baffle plate includes a first portion and a second portion. The first portion includes a center of the baffle plate and first holes extending through the baffle plate. The second portion includes an edge of the baffle plate and second holes extending through the baffle plate. The second portion has a greater conductance than the first portion.

In another general aspect, a cryopump baffle plate includes a first portion and a second portion. The first portion includes a center of the baffle plate and first holes extending through the baffle plate. The second portion includes an edge of the baffle plate and second holes extending through the baffle plate. The second portion has a greater conductance than the first portion.

With the cryopump and the cryopump baffle plate, the second portion has a greater conductance than the first portion so that gas readily flows through the second portion of the baffle plate into the main body. Thus, condensed gas is readily deposited on the circumferential portion (portion including the edge) of the cryopanel so that deposited condensed gas is not concentrated at the central portion (portion including the center) of the cryopanel in plan view. Therefore, the deposited amount of condensed gas becomes more uniform on the cryopanel. This improves the evacuation capability of the cryopump.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment of a cryopump and a baffle plate for a cryopump will now be described with reference to FIGS. 1 to 3.

Cryopump

Figure 1:
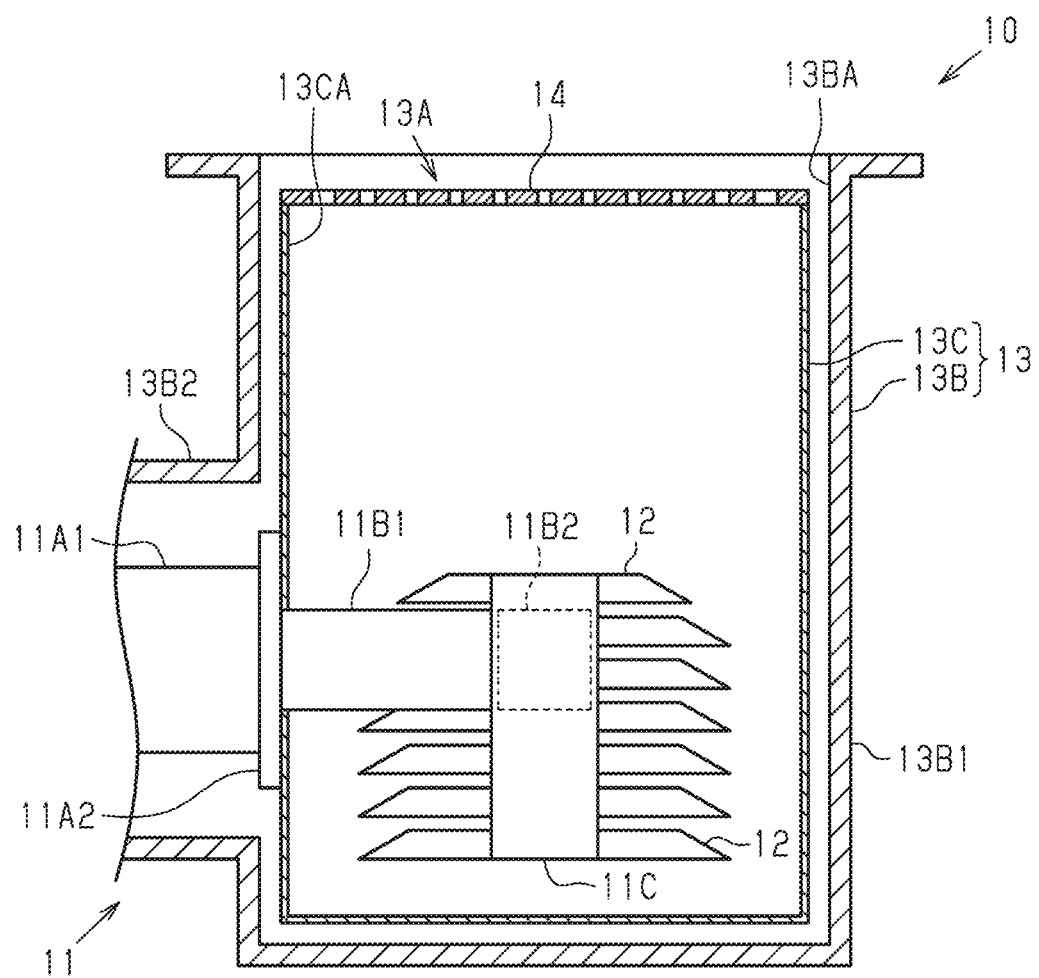
FIG. 1 is a cross-sectional view illustrating a cryopump of an embodiment.

As illustrated in FIG. 1, a cryopump 10 includes a refrigerator 11, cryopanels 12, a main body 13, and a baffle plate 14. In FIG. 1, the main body 13 and the baffle plate 14 of the cryopump 10 are illustrated in cross section, and the refrigerator 11 and the cryopanels 12 are illustrated in a side view. FIG. 1 illustrates only part of the refrigerator 11 for the sake of convenience.

The cryopanels 12 are connected to the refrigerator 11. The main body 13 accommodates the cryopanels 12. The main body 13 includes a gas inlet 13A. The baffle plate 14 is located in the gas inlet 13A of the main body 13.

The main body 13 includes a pump case 13B and a heat shield 13C. The pump case 13B is a vacuum container that separates the inside of the cryopump 10 from the outside of the cryopump 10. The pump case 13B includes a first accommodation portion 13B1 and a second accommodation portion 13B2. The first accommodation portion 13B1 accommodates the heat shield 13C. The second accommodation portion 13B2 accommodates the refrigerator 11. The first accommodation portion 13B1 is cylindrical. The first accommodation portion 13B1 includes a closed bottom end and an opposite open end 13BA.

The heat shield 13C protects the cryopanel 12 from radiant heat of the pump case 13B. The heat shield 13C is located between the pump case 13B and the cryopanels 12. The heat shield 13C is cylindrical. The heat shield 13C includes a closed bottom end and an opposite open end 13CA. The heat shield 13C accommodates the cryopanels 12. The open end 13CA of the heat shield 13C is surrounded by the open end 13BA of the pump case 13B. The open end 13CA of the heat shield 13C and the open end 13BA of the pump case 13B define the gas inlet 13A.

The refrigerator 11 is, for example, a Gifford-McMahon cooler. The refrigerator 11 includes a first cylinder 11A1, a first stage 11A2, a second cylinder 11B1, and a second stage 11B2. The first cylinder 11A1 is connected to the second cylinder 11B1 along a straight line. A first displacer (not illustrated) is located in the first cylinder 11A1, and a second displacer (not illustrated) is located in the second cylinder 11B1.

The first cylinder 11A1 is located in the second accommodation portion 13B2 of the pump case 13B. The first stage 11A2 is fixed to the end of the first cylinder 11A1 that is connected to the second cylinder 11B1. The first stage 11A2 contacts the heat shield 13C. This thermally connects the first stage 11A2 to the heat shield 13C.

The second cylinder 11B1 is located in the space defined inside the heat shield 13C. The second stage 11B2 is fixed to the end of the second cylinder 11B1 that is located at the opposite side of where the first cylinder 11A1 is connected. A coupling member 11C is connected to the second stage 11B2 to couple the cryopanels 12 to the refrigerator 11.

The cryopanels 12 are located in the space defined inside the heat shield 13C. Each cryopanel 12 is attached to the coupling member 11C. This thermally connects each cryopanel 12 to the second stage 11B2. Each cryopanel 12 is formed by a panel member. Each cryopanel 12 has the shape of a truncated cone. In plan view, the cryopanels 12 attached to the coupling member 11C are coaxial with one another. The term "plan view" as used in the present disclosure refers to a view of a member taken from a position where the viewer faces a plane along which the baffle plate 14 extends, for example, a view taken from above the baffle plate in FIG. 1. In other words, plan view is a view of a member taken in a direction orthogonal to a plane in which the baffle plate 14 is located. Further, the term "planar structure" as used in the present disclosure refers to the structure of a member in plan view.

The refrigerator 11 cools the first stage 11A2 to, for example, a predetermined first temperature included in a range of 80K or greater and 100K or less and cools the second stage 11B2 to, for example, a predetermined second temperature included in a range of 10K or greater and 20K or less. As described above, the heat shield 13C is thermally connected to the first stage 11A2. Thus, the heat shield 13C is cooled to the temperature of the first stage 11A2. The cryopanels 12 are connected to the second stage 11B2 by the coupling member 11C. Thus, the cryopanels 12 are cooled to the temperature of the second stage 11B2.

In the cryopump 10, the baffle plate 14 and the heat shield 13C trap gases that have a relatively low vapor pressure and condense at the first temperature. Such gases are evacuated out of a vacuum chamber to which the cryopump 10 is connected. Further, in the cryopump 10, the cryopanels 12 trap gases that have a relatively high vapor pressure and condense at the second temperature. Such gases are evacuated out of the vacuum chamber to which the cryopump 10 is connected.

Figure 2:
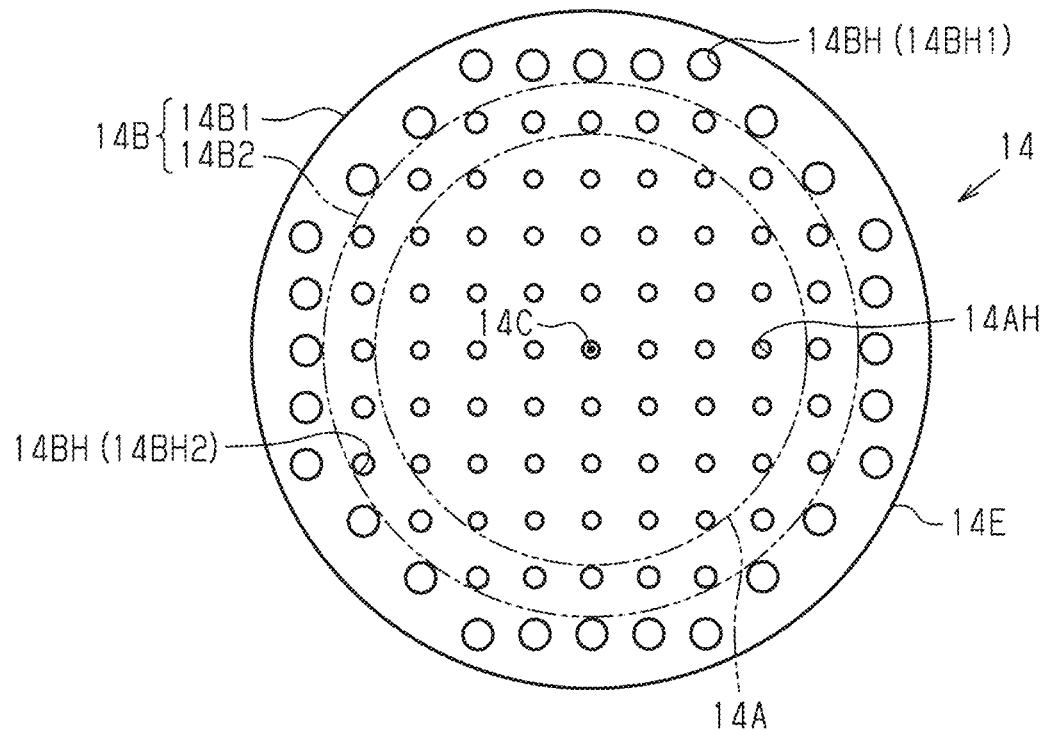
FIG. 2 is a diagram illustrating the shape of a baffle plate in plan view.

FIG. 2 illustrates the planar structure of the baffle plate 14.

As illustrated in FIG. 2, the baffle plate 14 includes a first portion 14A and a second portion 14B. The first portion 14A includes the center 14C of the baffle plate 14. The first portion 14A includes first holes 14AH extending through the baffle plate 14. Each first hole 14AH extends through the baffle plate 14 in a thickness-wise direction of the baffle plate 14. The second portion 14B includes the edge 14E of the baffle plate 14. The second portion 14B includes second holes 14BH extending through the baffle plate 14. The second portion 14B has a greater conductance than the first portion 14A.

The conductance of the second portion 14B, which is greater than conductance of the first portion 14A, increases the gas that flows through the second portion 14B of the baffle plate 14 into the main body 13. This increases the condensed gas deposited on the circumferential portion (portion including the edge) of the cryopanels 12 so that condensed gas is not deposited in a concentrated manner on the central portion (portion including the center and surrounded by circumferential portion) of the cryopanels 12 in plan view. Therefore, the deposited amount of condensed gas on the cryopanels 12 is more uniform. This expands the region on which condensed gas can be deposited in the main body 13 and improves the evacuation capability of the cryopump 10.

Conductance is an index indicating the ease with which gas flows through a passage. As long as the pressure difference between two locations connected by the flow passage is the same, the flow rate of gas flowing through the flow passage increases as the conductance of the flow passage increases. Conductance is a value dependent on the cross-sectional area of the flow passage, the length of the flow passage, the type of gas flowing through the passage, temperature, and the like.

The open area ratio of the second portion 14B resulting from the second holes 14BH may be greater than the open area ratio of the first portion 14A resulting from the first holes 14AH so that the conductance of the second portion 14B is greater than the conductance of the first portion 14A. The cryopump 10 allows the conductance of the baffle plate 14 to be greater at the second portion 14B than the first portion 14A more easily as compared with when setting a different thickness for the first portion 14A and the second portion 14B. Further, since the thickness of the baffle plate 14 does not have to be increased, the baffle plate 14 does not decrease the volume of the main body 13 due to the thickness of the baffle plate 14.

The first holes 14AH and the second holes 14BH may be circular holes, or circular in plan view. Each of the first holes 14AH and the second holes 14BH is a circular hole extending through the baffle plate 14 in the thickness-wise direction. The second holes 14BH may have a larger diameter than the first holes 14AH.

This structure allows the second portion 14B to have a greater conductance than the first portion 14A while limiting the number of the second holes 14BH to less than or equal to the number of the first holes 14AH. Thus, the baffle plate 14 can be easily processed.

The second holes 14BH may include large holes 14BH1 and medium holes 14BH2. Each large hole 14BH1 is an example of a third hole, and each medium hole 14BH2 is an example of a fourth hole. The medium hole 14BH2 (fourth hole) is smaller than the large hole 14BH1 (third hole). The second portion 14B may include a circumferential portion 14B1 and an intermediate portion 14B2. In the examples illustrated in FIGS. 2 and 3, the circumferential portion 14B1 includes the edge 14E of the baffle plate 14 and the large holes 14BH1. The intermediate portion 14B2, which is located between the circumferential portion 14B1 and the first portion 14A, includes the medium holes 14BH2.

Figure 3:
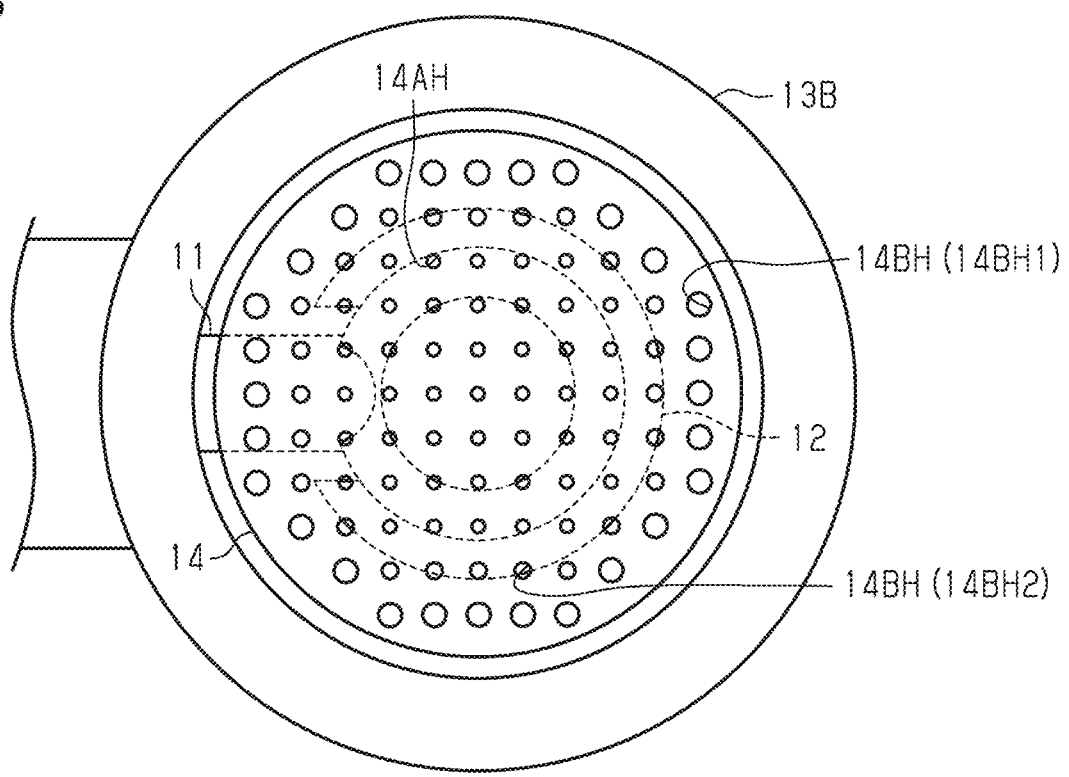
FIG. 3 is a diagram illustrating the structure of the cryopump in plan view.

In examples illustrated in FIGS. 2 and 3, the first portion 14A is circular. The first portion 14A may include only the first holes 14AH. The intermediate portion 14B2 may also be referred to as a first annular portion surrounding the first portion 14A. The intermediate portion 14B2 (first annular portion) may include only the medium holes 14BH2 (fourth holes). The circumferential portion 14B1 may also be referred to as a second annular portion surrounding the intermediate portion 14B2 (first annular portion). The circumferential portion 14B1 (second annular portion) may include only the large holes 14BH1 (third holes). The number of the large holes 14BH1 (third holes) is equal to or greater than the number of the medium holes 14BH2 (fourth holes).

In this manner, the conductance of the baffle plate 14 is increased in the order of the first portion 14A, the intermediate portion 14B2, and the circumferential portion 14B1. This reduces the difference in the deposited amount of condensed gas in the radial direction of the cryopanels 12 as compared with when the conductance of the baffle plate 14 is uniform throughout the second portion 14B.

As illustrated in the example of FIG. 2, when the first holes 14AH and the second holes 14BH are circular holes, the medium holes 14BH2 are smaller in diameter than the large holes 14BH1. The diameter of the second holes 14BH may be greater than one times the diameter of the first holes 14AH and less than or equal to three times the diameter of the first holes 14AH. In the example of FIG. 2, each second hole 14BH in the circumferential portion 14B1 is a large hole 14BH1, and each second hole 14BH in the intermediate portion 14B2 is a medium hole 14BH2.

The through holes of the baffle plate 14, including the first holes 14AH and the second holes 14BH, are arranged in a grid-like pattern. In the example illustrated in FIG. 2, each through hole is located on a grid point of a square grid.

FIG. 3 illustrates the planar structure of the cryopump 10.

As illustrated in 3, in plan view, the cryopanels 12 are located in a region corresponding to the first portion 14A and the intermediate portion 14B2. Thus, the circumferential portion 14B1 does not oppose the cryopanels 12. This reduces the heat input from the large holes 14BH1 of the circumferential portion 14B1 to the cryopanels 12 and allows the distribution of condensed gas to be more uniform.

Hereafter, the cryopanel 12 of the cryopanels 12 that is the closest to the baffle plate 14 will be referred to as "the first cryopanel", and the other cryopanels 12 will be referred to as "the second cryopanels". In the example illustrated in FIG. 1, the first cryopanel has a smaller diameter than the second cryopanels. Each cryopanel 12 has the shape of a truncated cone in plan view. In plan view, the sloped surface of each second cryopanel extends outward from the first cryopanel. In plan view, some of the medium holes 14BH2 overlap the sloped surface of each second cryopanel.

EXPERIMENTAL EXAMPLES

Through holes were formed in a grid-like pattern in discs having a diameter of 183 mm or greater and 189 mm or less and a thickness of 2 mm to obtain the baffle plates of experimental examples 1 to 5. Tables 1 and 2, which are illustrated below, indicate the number and size of the through holes set for the baffle plate of each experimental example. The baffle plate of each experimental example was applied to a cryopump to simulate and calculate the volume of condensed argon (Ar) gas formed on the upper part of the first cryopanel and the thickness of condensed Ar gas formed on side surfaces of the group of cryopanels in a region defined by the heat shield. The distribution of condensed Ar gas formed on the upper part of the first cryopanel was also simulated and calculated. Experimental examples 1, 4, and 5 included only one type of second holes, which are larger than the first holes, in the second portion of the baffle plate. Also, an annular gap was formed in the second portion (proximate to the edge of circumferential portion) in experimental examples 1 and 5 of the baffle plate.

TABLE 1

|  | Experimental Example 1 | | Experimental Example 2 | | | Experimental Example 3 | | |
| --- | --- | --- | --- | --- | --- | --- | --- | --- |
| Deposition Ar (std * L) | 2000 | | 1800 | | | 1900 | | |
| Diameter (mm) | 2nd Hole | 1st Hole | Large Hole | Medium Hole | 1st Hole | Large Hole | Medium Hole | 1st Hole |
|  | 6.8 | 4.4 | 7.5 | 6.0 | 5.1 | 8.5 | 5.4 | 4.2 |
| Number | 52 | 37 | 28 | 48 | 21 | 28 | 32 | 37 |
| Conductance Ratio | 1.55 | 1 | 1.45 | 1.24 | 1 | 2.79 | 1.44 | 1 |
| Circumference Gap (mm) | 188 to 188.5 | | N/A | | | N/A | | |
| Side Surface Ar Thickness (mm) | 8.42 | | 8.33 | | | 8.36 | | |

TABLE 2

|  | Experimental Example 4 | | Experimental Example 5 | |
| --- | --- | --- | --- | --- |
| Deposition Ar (std * L) | 1800 | | 1900 | |
| Diameter (mm) | 2nd Hole | 1st Hole | 2nd Hole | 1st Hole |
|  | 8.3 | 2.0 | 7.7 | 4.2 |
| Number | 37 | 52 | 52 | 37 |

TABLE 2-continued

|  | Experimental Example 4 | Experimental Example 5 |
|---|---|---|
| Conductance Ratio | 7.07  1 | 2.91  1 |
| Circumference Gap (mm) | N/A | 183 to 188.5 |
| Side Surface Ar Thickness (mm) | 8.36 | 8.62 |

It can be understood from tables 1 and 2 that the volume of condensed Ar gas was greater than or equal to 1800 L, and the deposited amount of the condensed Ar gas was equal to or greater than 70% of the space above the first cryopanel. Further, the thickness of condensed Ar gas deposited on the side surfaces of the cryopanels was 8.33 mm or greater.

In experimental examples 5 and 1, condensed Ar gas was deposited more uniformly on the upper part of the first cryopanel than the baffle plate in experimental example 4. This indicates that the preferable diameter of the second hole is greater than one times the diameter of the first hole and less than or equal to three times the diameter of the first hole. Further, in the baffle plates of experimental examples 2 and 3, the condensed Ar gas deposited on the upper part of the first cryopanel was substantially uniform.

An exemplary structure of the cryopump 10 and the baffle plate 14 for the cryopump 10 has following advantages.

(1) The baffle plate 14 includes the first portion 14A and the second portion 14B. The first portion 14A includes the center of the baffle plate 14 and the first holes 14AH. The second portion 14B includes the edge of the baffle plate 14 and the second holes 14BH. The second portion 14B has a greater conductance than the first portion 14A. With this structure, gas readily flows through the second portion 14B of the baffle plate 14 into the main body 13. Thus, condensed gas is readily deposited on the circumferential portion (portion including the edge) of the cryopanels 12 so that the deposited condensed gas is not concentrated at the central portion (portion including the center) of the cryopanels 12 in plan view. Therefore, the deposited amount of condensed gas becomes more uniform on the cryopanels 12. This expands the region on which condensed gas can be deposited in the main body 13. Thus, evacuation capability of the cryopump 10 is improved.

(2) In the baffle plate 14, the second portion 14B including the second holes 14BH has a greater open area ratio than the first portion 14A including the first holes 14AH. This readily allows the conductance of the second portion 14B to be greater than the conductance of the first portion 14A even when the first portion 14A and the second portion 14B have the same thickness.

(3) The second hole 14BH has a greater diameter than the first hole 14AH. This structure readily allows the conductance of the second portion 14B to be greater than the conductance of the first portion 14A while limiting the number of the second holes 14BH to less than or equal to the number of the first holes 14AH. Thus, the baffle plate 14 can be easily processed.

(4) The second holes 14BH includes the large holes 14BH1 (third holes) and the medium holes 14BH2 (fourth holes). The large holes 14BH1 (third holes) are arranged in the circumferential portion 14B1 of the second portion 14B. The medium holes 14BH2 (fourth holes) are arranged in the intermediate portion 14B2 of the second portion 14B. The medium holes 14BH2 are smaller than the large holes 14BH1 and larger than the first holes 14AH. This readily increases the conductance of the baffle plate 14 in the order of the first portion 14A, the intermediate portion 14B2, and the circumferential portion 14B1. Further, the difference in the deposited amount of condensed gas is minimized in the radial direction of the cryopanels 12 as compared with when the baffle plate 14 has a uniform conductance throughout the second portion 14B.

(5) In plan view, the circumferential portion 14B1 of the baffle plate 14 does not oppose the cryopanels 12. This structure reduces the heat input to the cryopanels 12 resulting from the large holes 14BH1 of the circumferential portion 14B1 and allows condensed gas to be distributed more uniformly.

The above embodiment may be changed as described below. Further, the above embodiment and the following modifications can be combined as long as the combined modifications remain technically consistent with each other.

Cryopanel

In plan view, the circumferential portion 14B1 of the baffle plate 14 may overlap the cryopanels 12. Even in this case, advantage (1) can be obtained as long as the conductance of the second portion 14B is greater than the conductance of the first portion 14A.

The baffle plate 14 may be formed so that the first portion 14A overlaps the cryopanels 12 and so that the second portion 14B does not overlap the cryopanels 12 in plan view. This provides the following advantage.

(6) Since the second portion 14B does not overlap the cryopanels 12 in plan view, the second portion 14B increases the flow rate of gas supplied into the main body 13 in a region at the outside of the edge of each cryopanel 12. Thus, the deposited amount of condensed gas on the circumferential portion (portion including the edge) of the cryopanels 12 is suppressed from being less than the deposited amount of condensed gas on the central portion (portion including the center) of the cryopanels 12.

Baffle Plate

The second portion 14B does not have to include the circumferential portion 14B1 and the intermediate portion 14B2. In other words, the second holes 14BH of the second portion 14B may be of only one type having the same size. For example, the second holes 14BH of the same diameter may be formed throughout the second portion 14B. This also obtains the advantage similar to advantage (1) as long as the conductance of the second portion 14B is greater than the conductance of the first portion 14A.

At least one of the first holes 14AH and the second holes 14BH does not have to both be circular and may be, for example, polygonal in plan view. This also obtains the advantage similar to advantage (1) as long as the conductance of the second portion 14B is greater than the conductance of the first portion 14A.

When the first holes 14AH and the second holes 14BH are circular, the diameter of the second holes 14BH may be smaller than or equal to the diameter of the first holes 14AH. In this case, the open area ratio of the second portion 14B may be greater than the open area ratio of the first portion 14A if, for example, the density of the second holes 14BH in the second portion 14B is greater than the density of the first holes 14AH in the first portion 14A. This allows the conductance of the second portion 14B to be greater than the conductance of the first portion 14A.

The second portion 14B may have a lower open area ratio than the first portion 14A. In this case, the conductance of the second portion 14B may be greater than the conductance of the first portion 14A if, for example, the thickness of the second portion 14B is less than the thickness of the first portion 14A.

In the baffle plate 14, the through holes including the first holes 14AH and the second holes 14BH do not have to be arranged in a grid-like pattern. In this case, for example, the through holes of the baffle plate 14 may be arranged in a pattern of concentric rings. Alternatively, the through holes of the baffle plate 14 may be arranged at random.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A cryopump, comprising:
a cryopanel connected to a refrigerator;
a main body accommodating the cryopanel; and
a baffle plate located in a gas inlet of the main body, wherein
the baffle plate includes
a first portion that includes a center of the baffle plate and first holes extending through the baffle plate, and
a second portion that includes an edge of the baffle plate and second holes extending through the baffle plate, wherein
the second holes include a third hole and a fourth hole that is smaller than the third hole, and
the second portion includes
a circumferential portion that includes the edge and the third hole, and
an intermediate portion that is located between the circumferential portion and the first portion and includes the fourth hole, and
the second portion has a conductance that is greater than that of the first portion.

2. The cryopump according to claim 1, wherein an open area ratio of the second portion resulting from the second holes is greater than an open area ratio of the first portion resulting from the first holes.

3. The cryopump according to claim 1, wherein
the first holes and the second holes are circular, and
the second holes each have a greater diameter than each of the first holes.

4. The cryopump according to claim 1, wherein
the cryopanel is located in a region overlapping the first portion and the intermediate portion in plan view of the baffle plate.

5. The cryopump according to claim 1, wherein
the first portion overlaps the cryopanel in plan view of the baffle plate, and
the second portion does not overlap the cryopanel in plan view of the baffle plate.

6. A baffle plate for a cryopump, the baffle plate comprising:
a first portion that includes a center of the baffle plate and a first hole extending through the baffle plate, and
a second portion that includes an edge of the baffle plate and a second hole extending through the baffle plate, wherein
the second holes include a third hole and a fourth hole that is smaller than the third hole, and
the second portion includes
a circumferential portion that includes the edge and the third hole, and
an intermediate portion that is located between the circumferential portion and the first portion and includes the fourth hole, and
the second portion has a conductance that is greater than that of the first portion.

* * * * *